(12) United States Patent
Payyappilly et al.

(10) Patent No.: US 8,855,084 B2
(45) Date of Patent: Oct. 7, 2014

(54) PREVENTING LOSS OF IP CONTINUITY WHEN TRANSITIONING BETWEEN DIFFERENT NETWORKS

(75) Inventors: Ajith Tom Payyappilly, San Diego, CA (US); Shrawan K. Khatri, San Diego, CA (US); Suli Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 13/323,508

(22) Filed: Dec. 12, 2011

(65) Prior Publication Data

US 2012/0155430 A1    Jun. 21, 2012

Related U.S. Application Data

(60) Provisional application No. 61/424,544, filed on Dec. 17, 2010.

(51) Int. Cl.
*H04W 4/00* (2009.01)
*H04W 36/00* (2009.01)
*H04W 76/06* (2009.01)

(52) U.S. Cl.
CPC ........ *H04W 36/0033* (2013.01); *H04W 76/068* (2013.01)
USPC ......................................................... 370/331

(58) Field of Classification Search
USPC ........... 370/328, 331, 332, 342; 455/418, 435
See application file for complete search history.

(56) References Cited

U.S. PATENT DOCUMENTS

| | | | | |
|---|---|---|---|---|
| 7,761,097 B2* | 7/2010 | Chaudry et al. | ........... | 455/435.2 |
| 2007/0097923 A1* | 5/2007 | Chaudry et al. | ............ | 370/332 |
| 2008/0089308 A1* | 4/2008 | Jentz et al. | ..................... | 370/342 |
| 2009/0275329 A1* | 11/2009 | Sokondar et al. | ............. | 455/434 |
| 2010/0046428 A1* | 2/2010 | Lee et al. | ..................... | 370/328 |
| 2010/0046477 A1* | 2/2010 | Marin et al. | ................... | 370/332 |
| 2010/0135206 A1 | 6/2010 | Cherian et al. | | |
| 2010/0177629 A1 | 7/2010 | Payyappilly et al. | | |
| 2010/0267383 A1* | 10/2010 | Konstantinou et al. | ..... | 455/435.2 |
| 2011/0039529 A1* | 2/2011 | Kim et al. | ..................... | 455/418 |

FOREIGN PATENT DOCUMENTS

| | | |
|---|---|---|
| EP | 2114106 A1 | 11/2009 |
| WO | WO2010138634 | 12/2010 |

OTHER PUBLICATIONS

International Search Report and Written Opinion—PCT/US2011/064692—ISA/EPO—Feb. 28, 2012.
Akan, et al., "Handoff Performance Improvement with Latency Reduction in Next Generation Wireless Networks," Wireless Networks 11, 2005, pp. 319-332.

(Continued)

*Primary Examiner* — Chirag Shah
*Assistant Examiner* — Jael Ulysse
(74) *Attorney, Agent, or Firm* — Patterson & Sheridan, L.L.P.

(57) ABSTRACT

Aspects of the present disclosure provide techniques for preventing loss of IP continuity when transitioning between networks. Certain aspects provide methods that generally include initiating a first timer upon attempting to transition from a first RAT network to a second RAT network during an IP session and initiating a second timer if a channel in the second RAT network is successfully acquired. According to aspects, a device may transfer context of the IP session to the second RAT network if a session is successfully negotiated in the second network prior to expiration of the second timer and the first and second networks share a common core network for IP services.

40 Claims, 12 Drawing Sheets

(56) References Cited

OTHER PUBLICATIONS

Mwangoka, et al., "Cognitive Mobility Management in Heterogeneous Networks," Instituto de Telecomunicações, Campus Universitário de Santiago, 3810-193 Aveiro, Portugal, MobiWac'10, Oct. 17-18, 2010, Bodrum, Turkey, pp. 37-44.

Yang, et al., "Fast Seamless Handover Scheme and Cost Performance Optimization for Ping-Pong Type of Movement," Department of Electronics and Information Engineering, Huazhong University of Science and Technology, Wuhan 430074, China, Institute for Informatics, University of Goettingen, 37083 Goettingen, Germany. Proc. Of 16th IEEE Int'l Symp. On Personal Indoor and Mobile Radio Communications, (PIMRC), Berlin, Germany, Sep. 2005, 5 pages.

* cited by examiner

PREVENTING LOSS OF IP CONTINUITY WHEN TRANSITIONING BETWEEN DIFFERENT NETWORKS

CROSS-REFERENCE TO RELATED APPLICATIONS

This application claims benefit of priority to U.S. Provisional Application Ser. No. 61/424,544, filed on Dec. 17, 2010, which is expressly herein incorporated by reference.

BACKGROUND

I. Field

Certain aspects of the present disclosure generally relate to wireless communications and, more particularly, to preventing loss of Internet Protocol (IP) continuity when a device transitions between radio access technologies (RATs) connected to a same core network for IP services.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The 3GPP LTE represents a major advance in cellular technology and it is a next step forward in cellular $3^{rd}$ generation (3G) services as a natural evolution of Global System for Mobile Communications (GSM) and Universal Mobile Telecommunications System (UMTS). The LTE provides for an uplink speed of up to 75 megabits per second (Mbps) and a downlink speed of up to 300 Mbps, and brings many technical benefits to cellular networks. The LTE is designed to meet carrier needs for high-speed data and media transport as well as high-capacity voice support. The bandwidth may be scalable from 1.25 MHz to 20 MHz. This suits the requirements of different network operators that have different bandwidth allocations, and also allows operators to provide different services based on spectrum. The LTE is also expected to improve spectral efficiency in 3G networks, allowing carriers to provide more data and voice services over a given bandwidth.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses OFDMA on the downlink and Single Carrier—Frequency Division Multiple Access (SC-FDMA) on the uplink. OFDMA allows data to be directed to or from multiple users on a subcarrier-by-subcarrier basis for a specified number of symbol periods.

SUMMARY

In an aspect of the disclosure, a method for wireless communications is provided. The method generally includes initiating a first timer upon attempting to transition from a first radio access technology (RAT) network to a second RAT network during an Internet Protocol (IP) session, initiating a second timer if a channel in the second RAT network is successfully acquired, and transferring context of the IP session to the second RAT network if a session is successfully negotiated in the second network prior to expiration of the second timer and the first and second networks share a common core network for IP services.

In an aspect of the disclosure, an apparatus for wireless communications is provided. The apparatus generally includes means for initiating a first timer upon attempting to transition from a first radio access technology (RAT) network to a second RAT network during an Internet Protocol (IP) session, means for initiating a second timer if a channel in the second RAT network is successfully acquired, and means for transferring context of the IP session to the second RAT network if a session is successfully negotiated in the second network prior to expiration of the second timer and the first and second networks share a common core network for IP services.

In an aspect of the disclosure, an apparatus for wireless communications is provided. The apparatus generally includes at least one processor and a memory coupled to the at least one processor. The at least one processor is typically configured to initiate a first timer upon attempting to transition from a first radio access technology (RAT) network to a second RAT network during an Internet Protocol (IP) session, initiate a second timer if a channel in the second RAT network is successfully acquired; and transfer context of the IP session to the second RAT network if a session is successfully negotiated in the second network prior to expiration of the second timer and the first and second networks share a common core network for IP services.

In an aspect of the disclosure, a computer-program product for wireless communication is provided. The computer-program product generally includes a non-transitory computer-readable medium having code stored thereon. The code is generally executable by one or more processors for initiating a first timer upon attempting to transition from a first radio access technology (RAT) network to a second RAT network during an Internet Protocol (IP) session; initiating a second timer if a channel in the second RAT network is successfully acquired; and transferring context of the IP session to the second RAT network if a session is successfully negotiated in the second network prior to expiration of the second timer and the first and second networks share a common core network for IP services.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
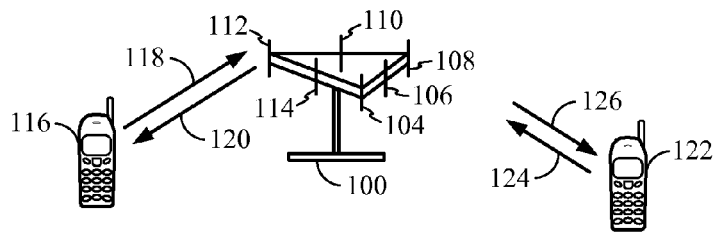
FIG. 1 illustrates an example multiple access wireless communication system, in accordance with aspects of the present disclosure.

As described in more detail below, aspects of the present disclosure provide techniques for a device to maintain internet protocol (IP) continuity when transitioning from a first radio access technology (RAT) network to a second RAT network when the first and second networks share a common core network for IP services. Thus, an IP mobility management module of a device may help maintain IP continuity in scenarios where core networks allow. Additionally, methods presented herein may minimize the time for which a device may be without some type of IP connectivity and may avoid unnecessary traffic channel setups.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

An access point ("AP") may comprise, be implemented as, or known as NodeB, Radio Network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect of the present disclosure is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
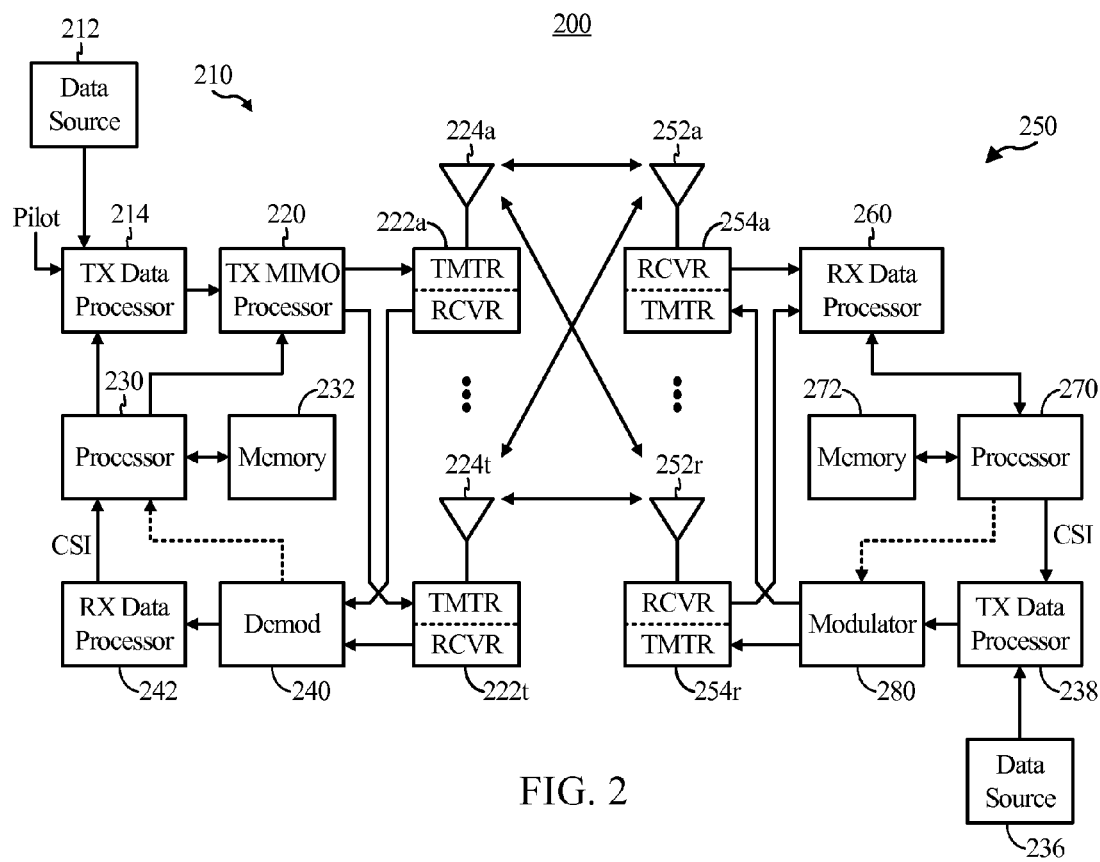
FIG. 2 illustrates a block diagram of an access point and a user terminal, in accordance with aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and down-converts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source

236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
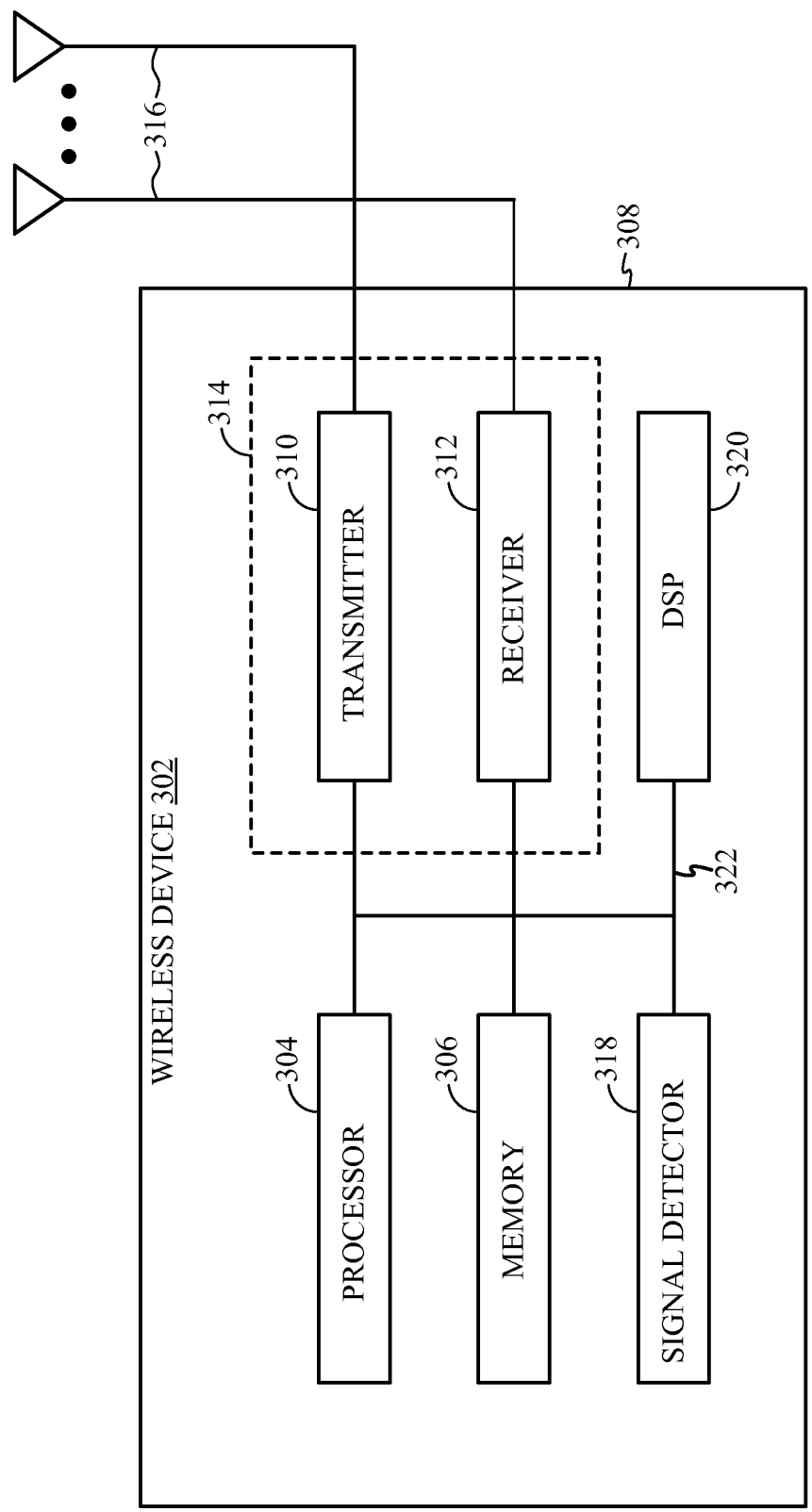
FIG. 3 illustrates a block diagram of an example wireless device, in accordance with aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Preventing Loss of IP Continuity during Mobility

A device may maintain Internet Protocol (IP) continuity when moving between networks that share a common core network for IP services. Long Term Evolution (LTE) and Evolved High Rate Packet Data (eHRPD) radio access technologies (RATs) are connected to the same 3GPP Evolved Packet Core (EPC) network. Thus, IP continuity may be maintained for data calls when a device moves between areas of LTE and eHRPD coverage. High Rate Packet Data (HRPD) and 1x RATs are connected to a 3GPP2 core network. Accordingly, IP continuity may not be maintained when a device moves between areas of LTE and HRPD coverage or LTE and 1x coverage.

According to current standards, however, a device may lose IP continuity when moving between LTE and eHRPD coverage areas when, for example, the device acquires a channel in another RAT network, for example a 1x network, before finding a data optimized (DO) or LTE channel. Aspects of the present disclosure provide techniques to prevent loss of IP continuity when a device moves between RATs that share a common core network.

As will be described in more detail below, a module in a device may initiate a first timer when moving from LTE or eHRPD coverage to 1x coverage. IP interfaces in LTE or eHRPD may not be immediately torn down.

When a device moves from LTE to eHRPD coverage and acquires 1x before acquiring DO, the device may wait for a system determination module to complete one full scan of Evolution-Data Optimized (EVDO) channels before declaring EVDO out of service (OOS). If the first timer expires prior to successfully acquiring a channel in the EVDO network, IP continuity may not be maintained. If, however, an EVDO channel is acquired before the expiration of the first timer, the first timer may be stopped and a second timer may be initiated.

The device may wait for EVDO session negotiation to complete during the time defined by the second timer, in an effort to determine if the acquired EVDO channel shares a common core network for IP services as the LTE network. If the acquired channel shares a common core network, for example eHRPD, IP continuity may be maintained and IP context may be transferred from LTE to eHRPD. If the acquired channel does not share a common core network, for example HRPD, or the second timer expires before successful negotiation in the EVDO network, IP continuity may not be maintained.

When a device moves from eHRPD to LTE coverage and acquires 1x before acquiring LTE, the device may wait for a system determination module to perform a scan of LTE channels. If an LTE channel is not found, or if the first timer expires before finding an LTE channel, IP continuity may not be maintained. If, however, an LTE channel is acquired before expiration of the first timer, the first timer may be stopped and a second timer may be initiated. If LTE attach completes before expiration of the second timer, IP continuity may be maintained.

Aspects of the present disclosure provide methods to maintain IP continuity when a device moves between LTE and eHRPD coverage and the device acquires a channel in a third network, for example 1x, before acquiring an EVDO or LTE network. As will be described in more detail below, aspects balance not waiting too long to declare maintaining IP continuity is not possible and prematurely declaring IP continuity is lost.

Figure 4:
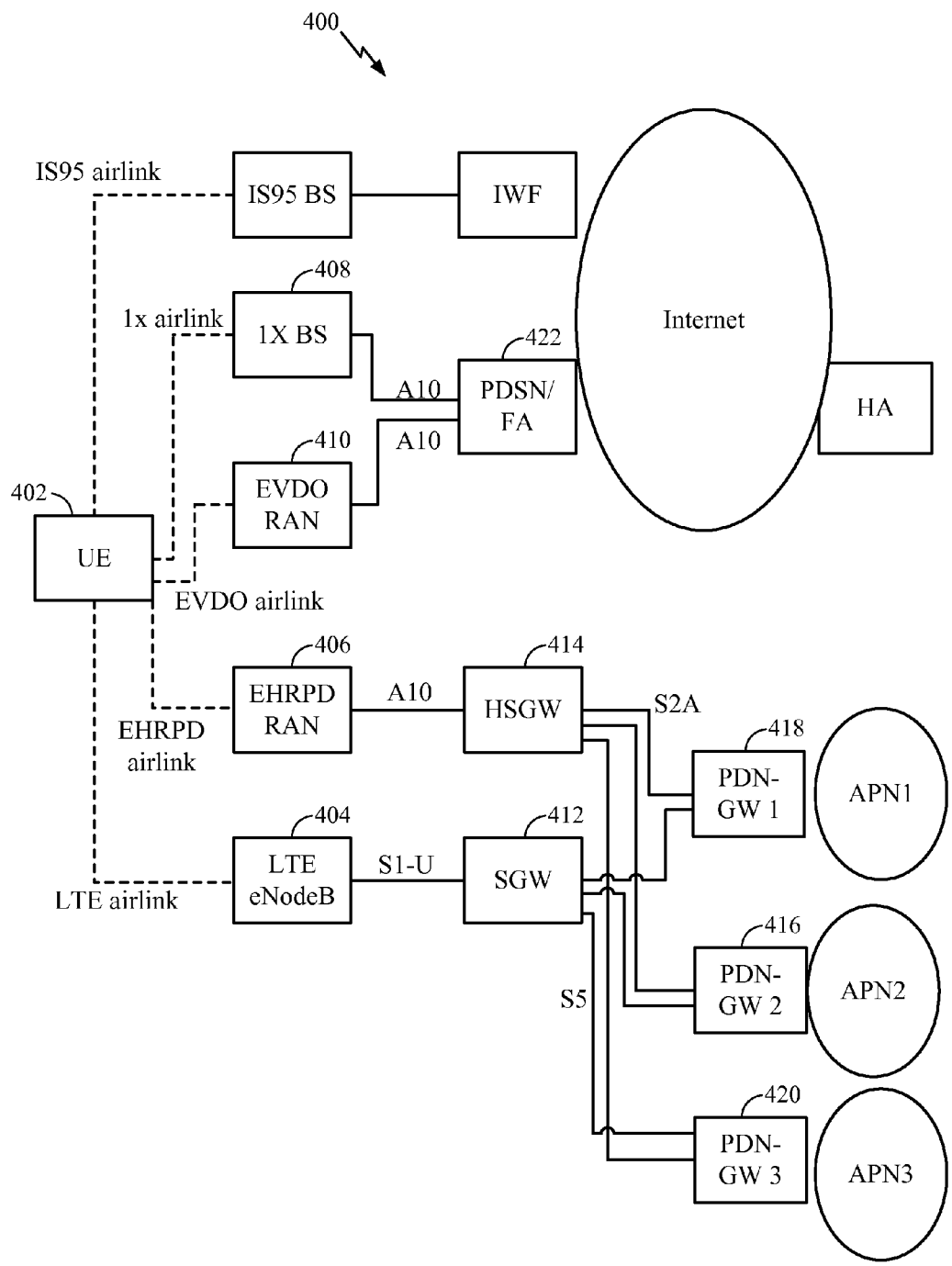
FIG. 4 illustrates an example network architecture, in accordance with aspects of the present disclosure.

FIG. 4 illustrates an example network architecture 400, according to aspects of the present disclosure. A device such as a multi-mode UE 402 may communicate with one or more RATs. UE 402 may communicate with, for example, LTE eNB 404, eHRPD radio access network (RAN) 406, 1x BS 408, and EVDO RAN 410.

LTE eNB 404 and eHRPD RAN 406 use an EPC (3GPP) core network for IP services. Serving gateway (SGW) 412, HRPD serving gateway (HSGW) 414, and packet data network gateway (PDN-GW) 416, 418, 420 may be considered part of the EPC. SGW 412 for LTE and HSGW 414 for eHRPD may assign an IP address to UE 402 after receiving it from the PDN-GW.

1× BS 408 and EVDO RAN 410 use a 3GPP2 core network. Packet Data Serving Node (PDSN) 422, which is part of the 3GPP2 core network, may assign an IP address to UE 402.

As described above, eHRPD uses a 3GPP core network and HRPD uses a 3GPP2 core network. Even though their core networks are different, eHRPD and HRPD may be considered 3GPP2 EVDO RATs.

When a device moves from one RAT to another, it may be possible to maintain IP continuity when the two RATs are connected to the same core network. For example, UE 402 moving between EVDO RAN 410 and 1× BS 408 may maintain continuity since both RATs are connected to the 3GPP2 core network.

Moving between RATs connected to the same core network may be transparent to applications, as the device may have the same IP address in the new RAT. In certain cases, a small delay in transferring data during the transition may be noticeable. Maintaining IP continuity may not be possible when a device moves between RATs connected to different core networks. In this case, a different IP address may be assigned to the device in the new RAT.

Even though LTE and eHRPD use the same core network for IP services, a device may lose IP continuity when moving between the two RATs. This may occur, for example, when the device acquires a channel in a RAT, for example 1×, that does not share the same core network as LTE and eHRPD before acquiring an EVDO or LTE channel (depending on the direction of device mobility).

Figure 5:
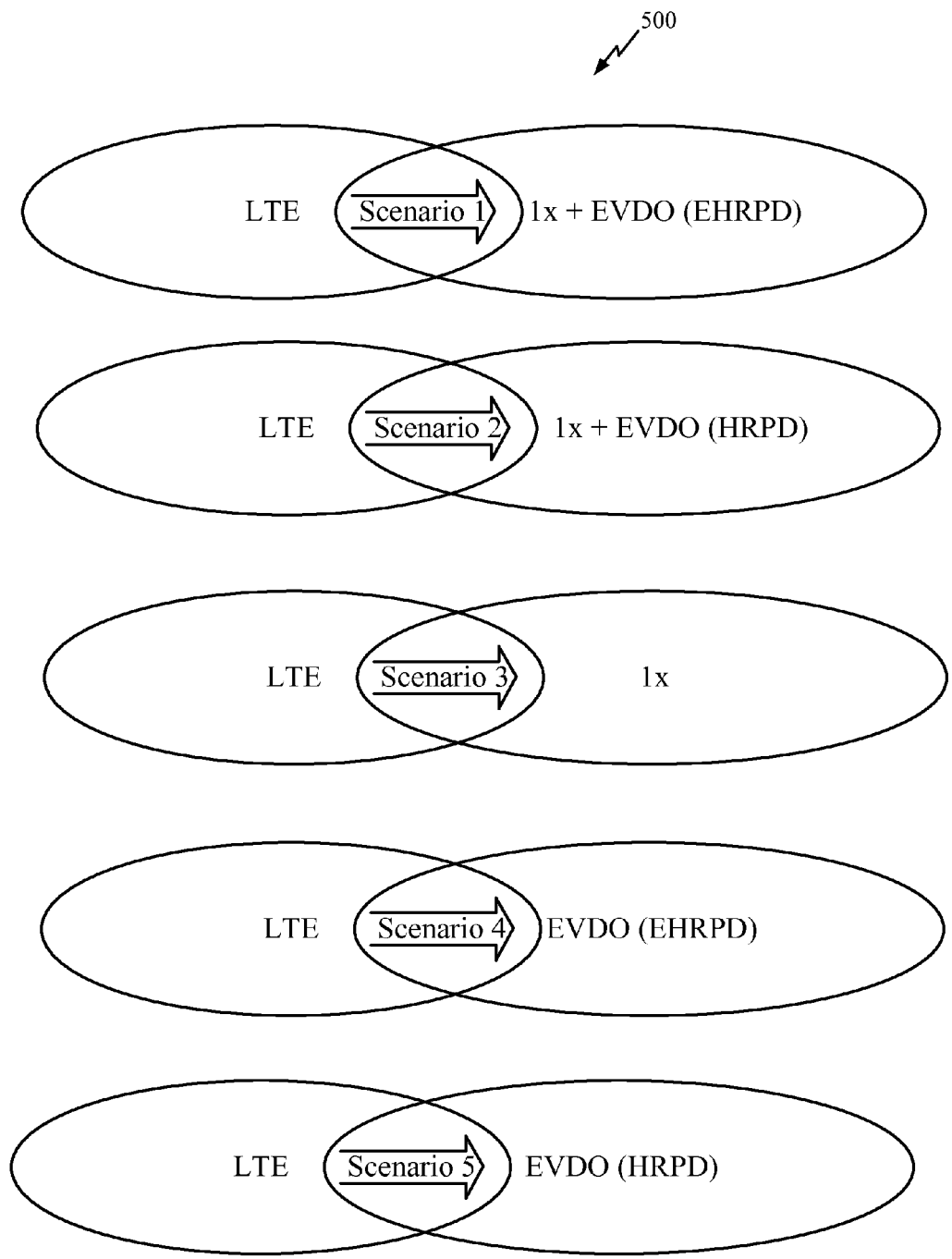
FIG. 5 illustrates examples of device mobility scenarios, in accordance with aspects of the present disclosure.

FIG. 5 illustrates an example network deployment and device mobility scenarios 500 according to aspects of the present disclosure. Scenarios 1 and 4 illustrate examples of UE mobility when a UE may maintain IP continuity. As previously described, a UE may maintain IP continuity when transitioning between RATs that share a common core network for IP services. In Scenario 1, a UE transitions from an LTE network to a 1×+EVDO (eHRPD) network and in Scenario 4, a UE transitions from an LTE network to an EVDO (eHRPD) network. As will be described in more detail below, aspects of the present disclosure provide methods to maintain IP continuity when a device moves between LTE and eHRPD.

Scenarios 2, 3, and 5 illustrate examples of UE mobility where IP continuity may not be maintained. In these scenarios, the UE is transitioning from LTE to a RAT that does not share a common core network as the LTE network. In Scenarios 2 and 5, a UE is transitioning from an LTE network to an HRPD network. In Scenario 3, a UE is transitioning from an LTE network to a 1× network. Accordingly, IP continuity may not be maintained during these scenarios.

Figure 6:
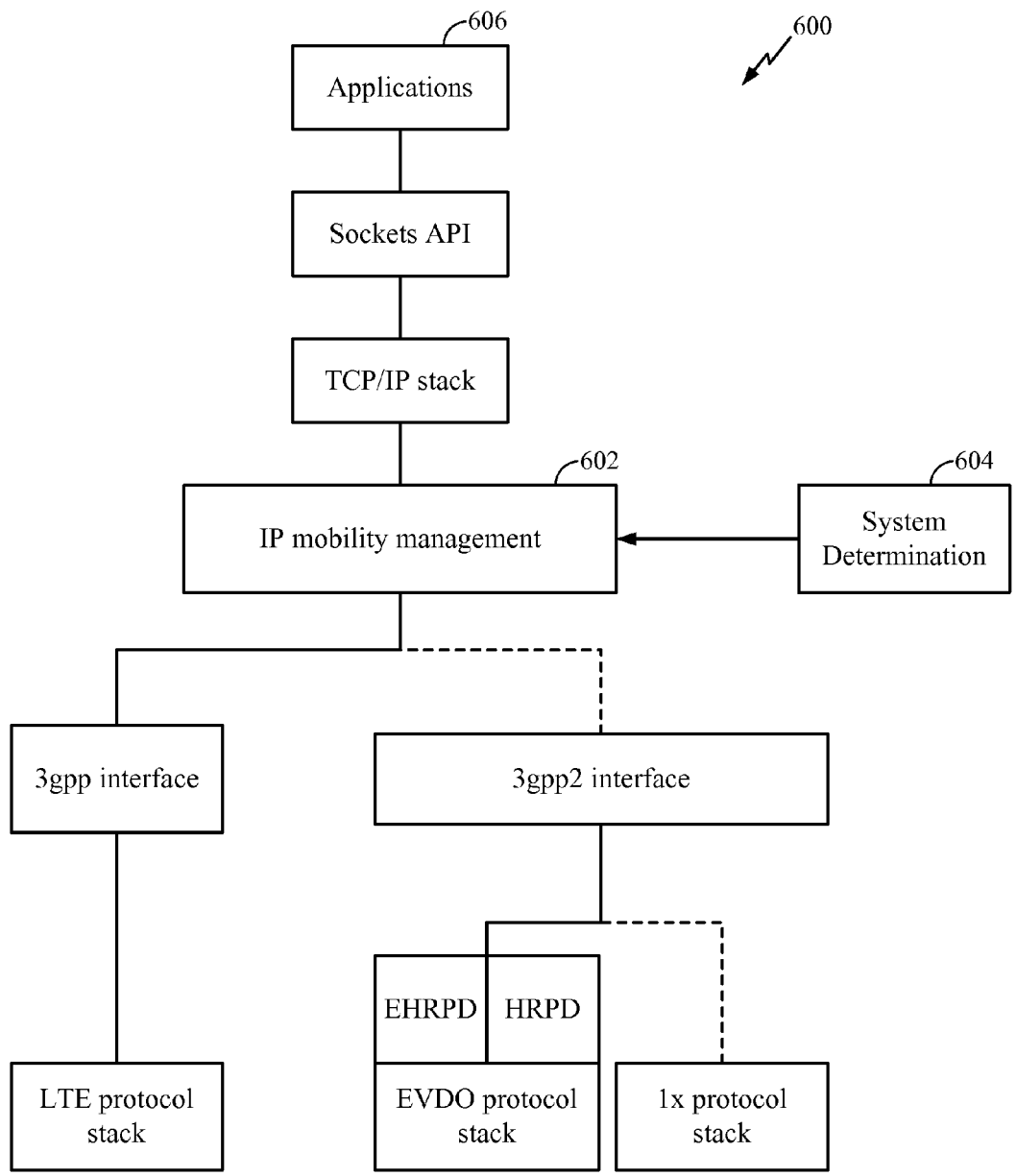
FIG. 6 illustrates an example of software architecture, in accordance with aspects of the present disclosure.

FIG. 6 illustrates an example software architecture 600, according to aspects of the present disclosure. In Scenario 1, even though IP continuity may be possible, in some situations, IP continuity may not be maintained.

A device, for example a hybrid mode 1×/EVDO device, moving from LTE to eHRPD, may acquire a 1× network prior to finding a co-located EVDO system. At the time the 1× network is acquired, a module responsible for IP mobility management 602, may not know whether an EVDO network may be found later. For example, the IP mobility management module 602 may not differentiate between Scenarios 1 and 3. Consequently, the IP mobility management module 602 may, upon acquiring the 1× network, locally tear down IP interfaces on the premise that it is not possible to maintain IP continuity when transitioning between LTE to 1×.

A similar situation may exist when a device moves in the opposite direction. An IP mobility management module 602 of a device moving from eHRPD to LTE may realize EVDO has been lost before losing 1× and finding an LTE network. This may depend on OOS algorithms for DO and 1× and/or the slot cycle index for DO and 1×. At the time DO is lost but 1× is still present, the IP mobility management module 602 may not know whether LTE may be found shortly. Accordingly, the IP mobility management module 602 may tear down IP interfaces based on the premise that it may not be possible to maintain IP continuity from eHRPD to 1×.

In Scenarios 4 and 5, at the time EVDO is acquired, the IP mobility management module 602 may not know if it is possible to maintain IP continuity. Until an EVDO session is negotiated, for example at EVDO Layer 3, the IP mobility management module 602 may not know if the network is HRPD, in which case IP continuity may not be maintained, or eHRPD, in which case IP continuity may be maintained. Thus, aspects of the present disclosure provide methods for a device to maintain IP continuity in scenarios where core networks allow, minimize the time a device is left without IP continuity, and avoid unnecessary traffic channel setups.

Figure 7:
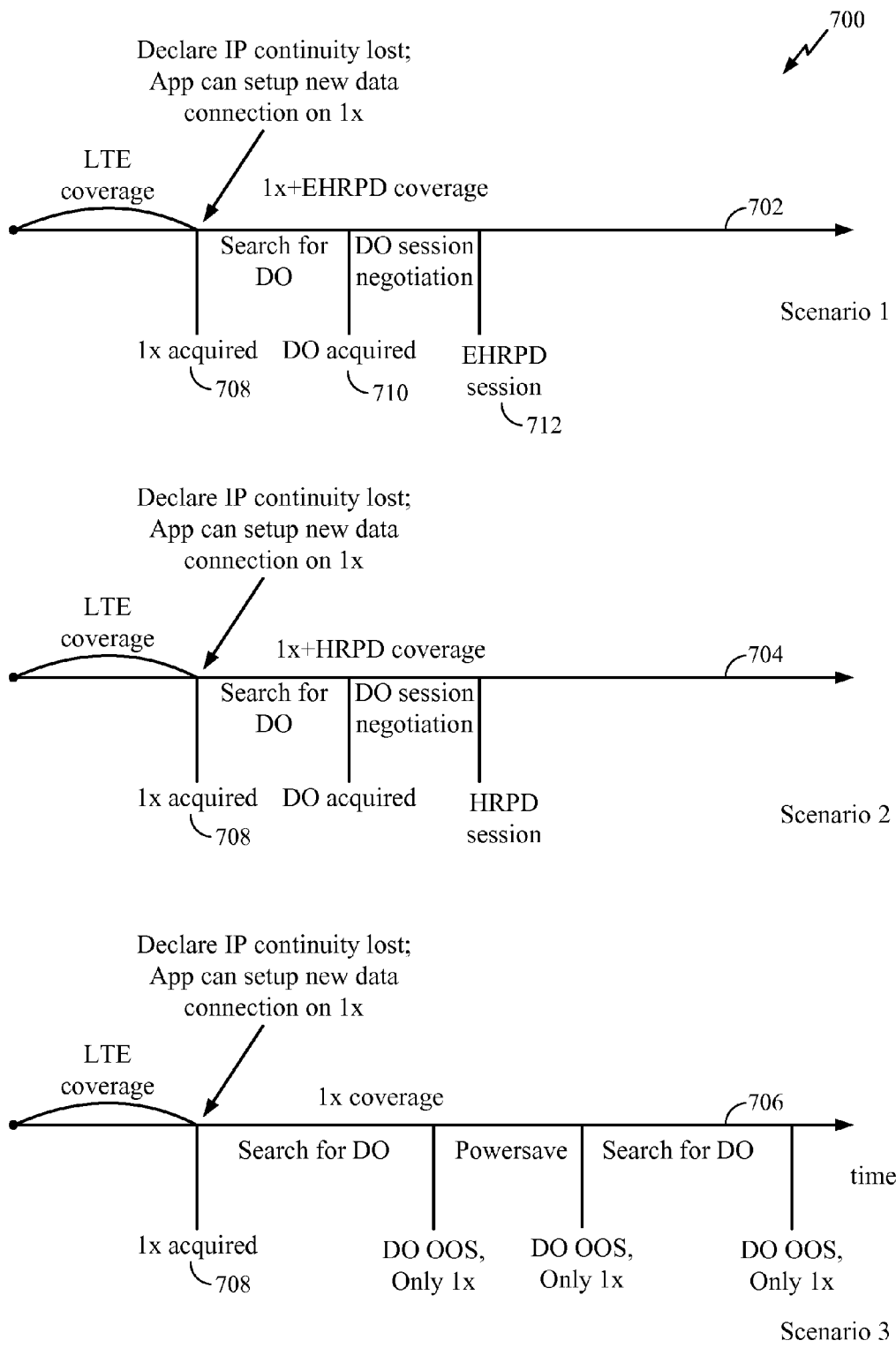
FIG. 7 illustrates an example approach for IP mobility management in accordance with aspects of the present disclosure.

FIG. 7 illustrates an example approach for IP mobility management 700, according to aspects of the present disclosure. At one end of the spectrum, as illustrated at 708, the IP mobility management module 602 may locally tear down the context of the IP session upon receiving notification from a system determination module 604 that a 1× network has been acquired when a device moves, in either direction, between LTE and eHRPD.

According to this approach, IP continuity will not be maintained in Scenarios 1, 2, and 3. If moving from LTE to eHRPD, the IP mobility management module may command the 3GPP-LTE interface and if moving from eHRPD to LTE, the IP mobility management module may command the 3GPP2-eHRPD interface to locally tear down the IP context and notify applications 606 that IP connectivity has been lost.

Advantageously, this approach allows the IP mobility management module to immediately setup a new 3GPP2-1× interface when an application wants IP connectivity. For example, in Scenarios 2 and 3, illustrated at 704 and 706 respectively, the IP mobility management module may set up a new data connection immediately after acquiring 1×.

According to this approach, however, IP continuity will be broken even if, eventually, the device would have acquired an EVDO network. In Scenario 1, illustrated at 702, IP continuity would be lost and the applications of the device would setup a new connection on the 1× network even though the device may have acquired EVDO, at 710, and negotiated an eHRPD session at 712.

Figure 8:
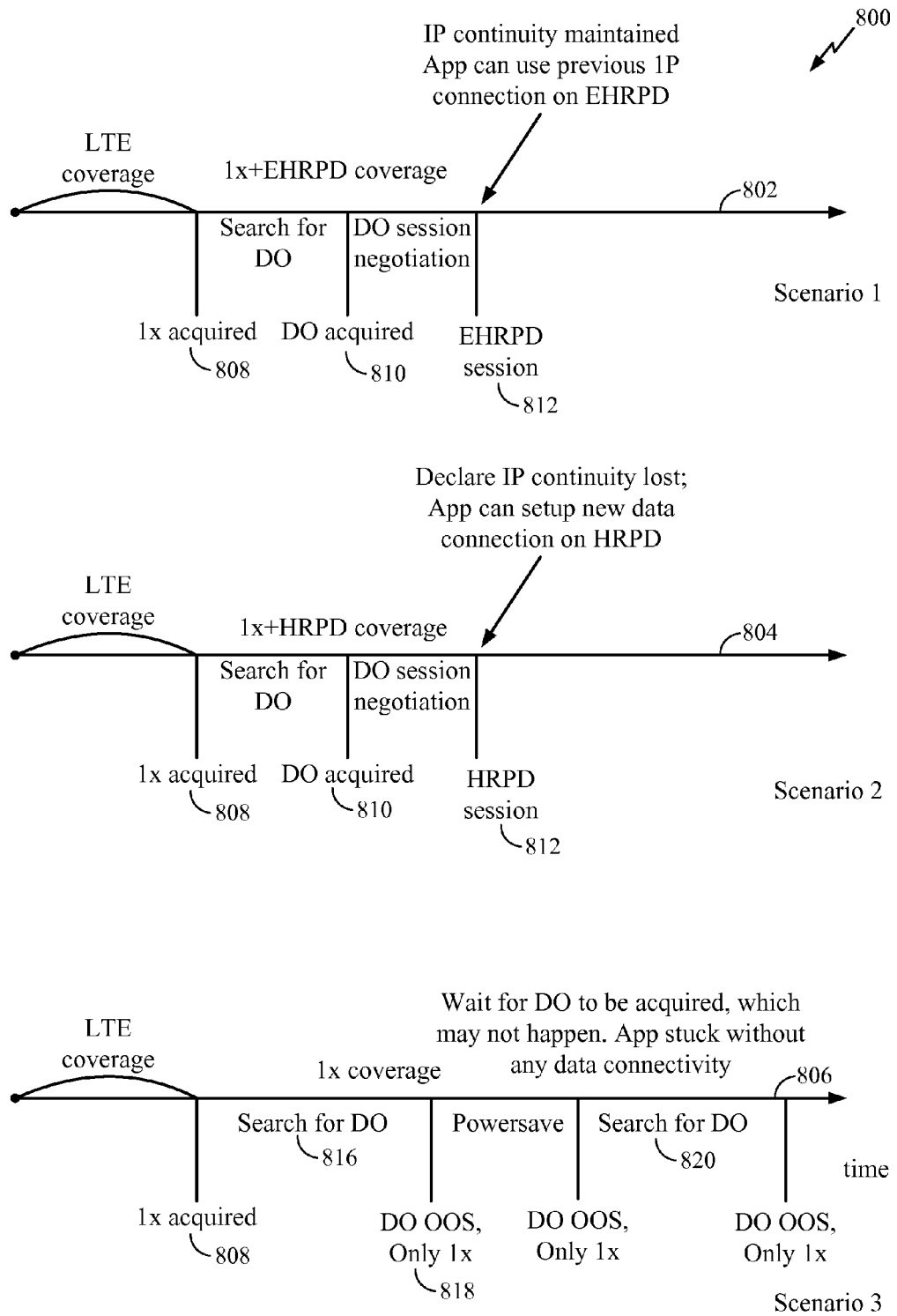
FIG. 8 illustrates an example approach for IP mobility management in accordance with aspects of the present disclosure.

FIG. 8 illustrates an example approach for IP mobility management 800, according to aspects of the present disclosure. At another end of the spectrum, the IP mobility management module 602 may wait to declare a loss of IP continuity until it is sure that IP continuity may not be maintained.

When a device moves from LTE to eHRPD, the IP mobility management module 602 may wait until completion of EVDO session negotiation to determine if IP continuity may be maintained. If the acquired network is eHRPD, the IP mobility management module may command the 3GPP-LTE interface to be torn down and create a new 3GPP2-eHRPD interface. When a device moves in the opposite direction, from eHRPD to LTE, the IP mobility management module 602 may know if continuity may be maintained after LTE attach is complete.

According to this approach, at 808, the IP mobility management module 602 may not act upon receiving indication from a system determination module 604 that a 1× network has been acquired. Advantageously, if a device is in Scenario 1, IP continuity may not be lost by premature action. At 802, a device in Scenario 1, may receive an indication that 1× is acquired and may search for and acquire EVDO at 810. At 812, the IP mobility management module may have negotiated an eHRPD session and may maintain IP continuity. Applications of the device may use their previous IP connections in the eHRPD network.

According to this approach, however, it may take a long time before an eHRPD network (or LTE network, if transitioning from eHRPD to LTE) is acquired. During this time, data may be buffered or dropped. Scenario 2, illustrated at 804, shows a device moving from LTE to HRPD. At 808, the device may acquire a 1× network. After acquiring 1×, the device may search for and acquire an EVDO network at 810. After EVDO session negotiation completes the device may declare loss of IP continuity if the acquired network is HRPD. At 814, the applications may setup a new data connection on the HRPD network.

In extreme cases, EVDO session negotiation may not occur, causing a device to be without data connectivity. For example, Scenario 3, illustrated at 806, shows a device moving from an LTE network to a 1× network. At 808, the device may acquire a 1× network and at 816, the device may search for an EVDO network. At 818, the device may declare DO OOS and enter a power saving mode. At 820, the device may continue to search for an EVDO network. In this scenario, the device may wait indefinitely to acquire an EVDO network, causing applications to be without data connectivity.

Figure 9:
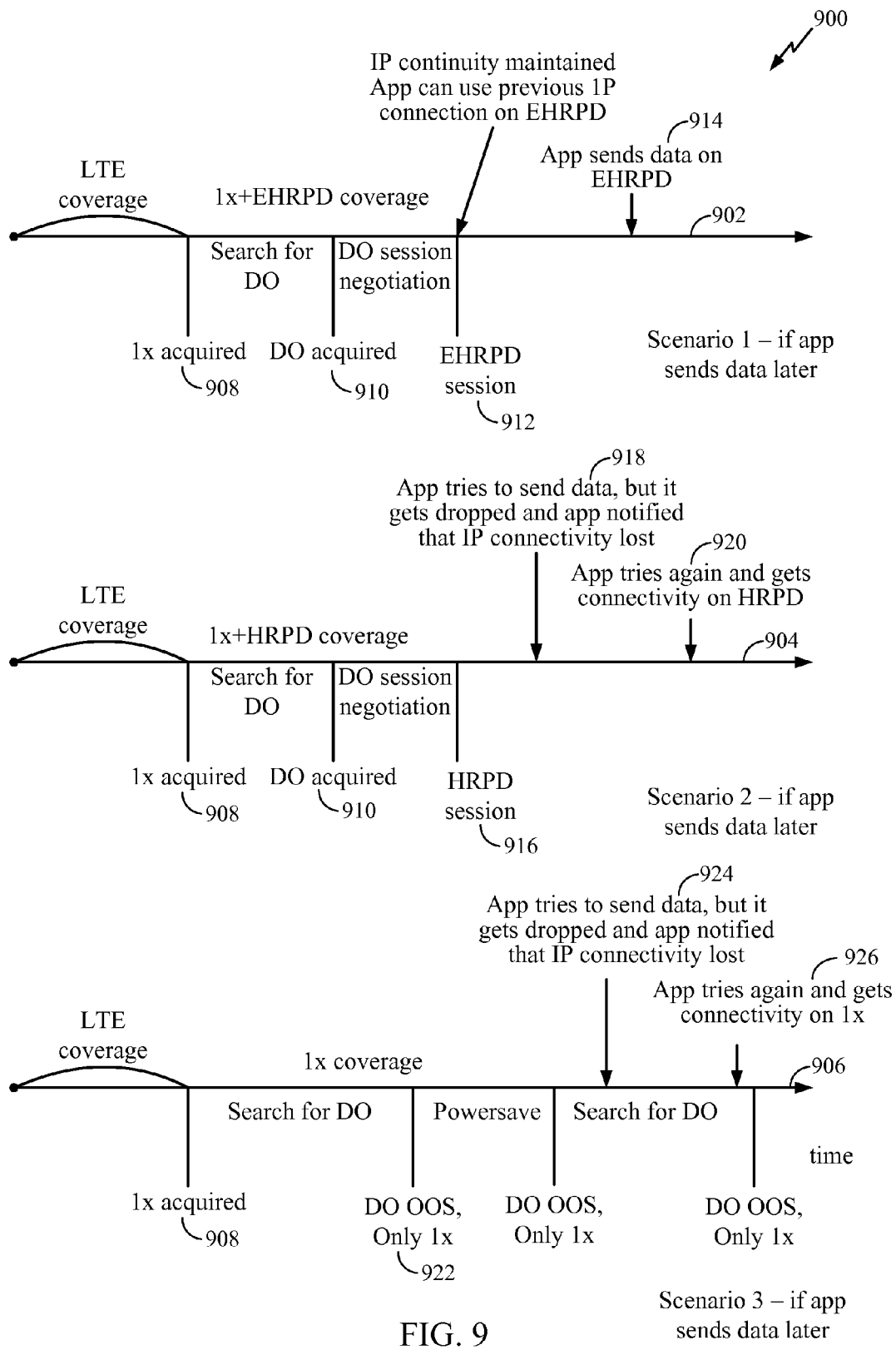
FIG. 9 illustrates example an approach for IP mobility management, in accordance with aspects of the present disclosure.
Figure 10:
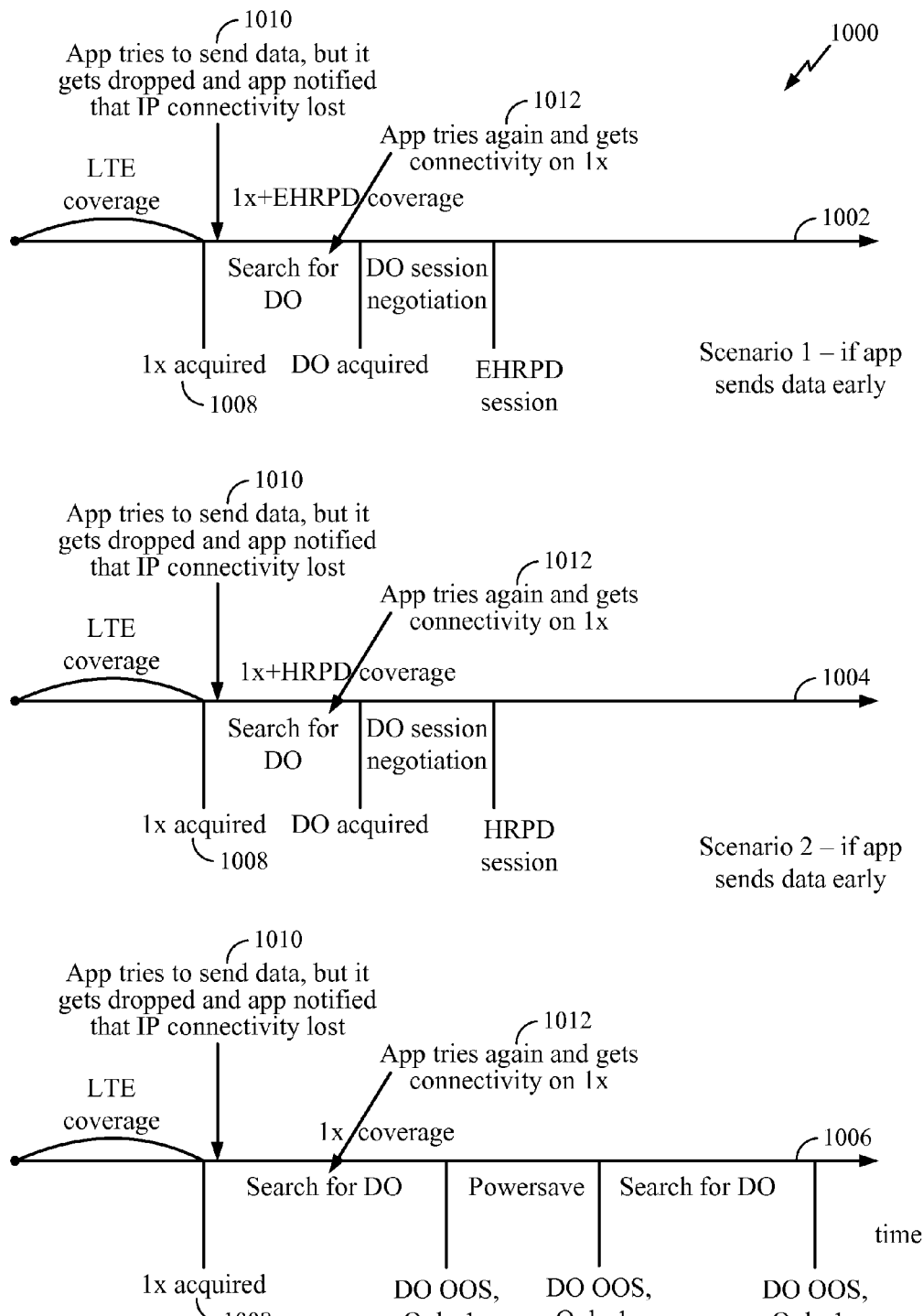
FIG. 10 illustrates an example approach for IP mobility management, in accordance with aspects of the present disclosure.

FIGS. 9 and 10 illustrate example approaches 900, 1000 for IP mobility management, according to aspects of the present disclosure where the IP mobility management module 602 does not act until an application 606 attempts to transmit data. FIG. 9 illustrates scenarios where an application attempts to transmit data later and FIG. 10 illustrates scenarios where an application attempts to transmit data earlier.

While moving from LTE to eHRPD, the LTE stack of a device may not transmit data when the device acquires a 1× network. Accordingly, the LTE stack may notify the IP mobility management module that the device is no longer in an LTE network. The IP mobility management module may then command the 3GPP-LTE interface to locally tear down and switch to setting up a new 3GPP2 interface, which may be either an eHRPD, HRPD, or 1× interface, depending on the mobility scenario. The IP mobility management module may use a similar approach when moving from eHRPD to LTE.

This approach may avoid unnecessary tear down of IP context when, for example, a device intermittently goes back and forth between networks in quick succession. Only when an application attempts to send data will the correct interface be set up. Accordingly, IP continuity may be maintained when possible, or the application may be notified that IP connectivity has been lost and needs to be setup again. This approach, however, may cause delays and potential data loss.

At 902, Scenario 1 is illustrated, showing a device moving from LTE to eHRPD. At 908, the device may acquire a 1× network and at 910, the device may search for and acquire an EVDO network. After completion of EVDO session negotiation, at 912, the device may determine that the acquired EVDO network is an eHRPD network. Accordingly, the device may maintain IP continuity in the eHRPD network. At 914, an application of the device may transmit data on eHRPD. IP continuity may be maintained in this scenario, since the application attempts to transmit data after the device acquired an eHRPD session.

At 904, Scenario 2 is illustrated, showing a device moving from LTE to HRPD. At 908, the device may acquire a 1× network and at 910, the device may search for and acquire an EVDO network. After completion of EVDO session negotiation, at 916, the device may determine that the acquired EVDO network is an HRPD network. At 918, an application may attempt to transmit data and may be notified that IP connectivity is lost. Since the LTE stack may not transmit data, the IP mobility management module may then tear down the 3GPP-LTE interface and switch to setting up a 3GPP2-HRPD interface. At 920, the application may attempt to retransmit data on the HRPD network.

At 906, Scenario 3 is illustrated, showing a device moving from LTE to 1×. At 908, the device may acquire a 1× network. The device may search for an EVDO network. At 922, the device may declare DO OOS and enter a power saving mode. At 924, an application may attempt to transmit data and may be notified that IP connectivity is lost. The IP mobility management module may then switch to setting up a new 3GPP2-1× interface. At 926, the application may attempt to retransmit data on the 1× network.

Referring now to FIG. 10, at 1008, a device may acquire a 1× network. At 1010, an application may attempt to transmit data. The data may be dropped and the application may be notified that IP connectivity is lost since the two RATs do not share the same core network for IP services. After the application attempts to transmit data, the IP mobility management module may command the 3GPP-LTE interface to be torn down and may switch to setting up a new 3GPP2 interface, which may be eHRPD, HRPD, or 1×, depending on the mobility scenario.

At 1002, Scenario 1 is illustrated, showing an application attempting to transmit data early when a device moves from LTE to eHRPD. At 1004, Scenario 2 is illustrated, showing an application attempting to transmit data early when a device moves from LTE to HRPD. At 1006, Scenario 3 is illustrated, showing an application attempting to transmit data early when a device moves from LTE to 1×. In each of these scenarios, at 1010, the IP mobility management module may command the 3GPP-LTE interface to be torn down after the application attempts to transmit data and receives notification that IP continuity has been lost. At 1012, the application may retransmit data with connectivity established on the acquired 1× network.

According to another approach for IP mobility management, the IP mobility management module 602 may try to setup a traffic connection whenever it receives a notification from a system determination module 604 that the network has changed.

When a device moves in the direction of LTE to eHRPD a traffic channel may be established on 1×, HRPD, or eHRPD. After the traffic channel is known for certain, the device may take action to transfer the IP context if the traffic connection is eHRPD. Alternatively, if the traffic connection is 1× or HRPD, the device may locally tear down the 3GPP-LTE interface and notify applications that the device has lost IP connectivity. If this occurs when the device has acquired 1× and is searching for EVDO, the origination may be attempted on the most recently acquired, co-located EVDO channel. A similar approach may be used when a device moves in the direction of eHRPD to LTE.

According to this approach, a device may take appropriate action in each of Scenarios 1-5. For example, when device is in Scenario 1, IP continuity may not be lost by premature action. However, if the device is in Scenario 3, a traffic channel may be unnecessarily setup on the 1× network, only to identify that the device is in a 1× network. Since the device may not maintain IP continuity, the traffic connection to the 1× network would need to be torn down.

Figure 11:
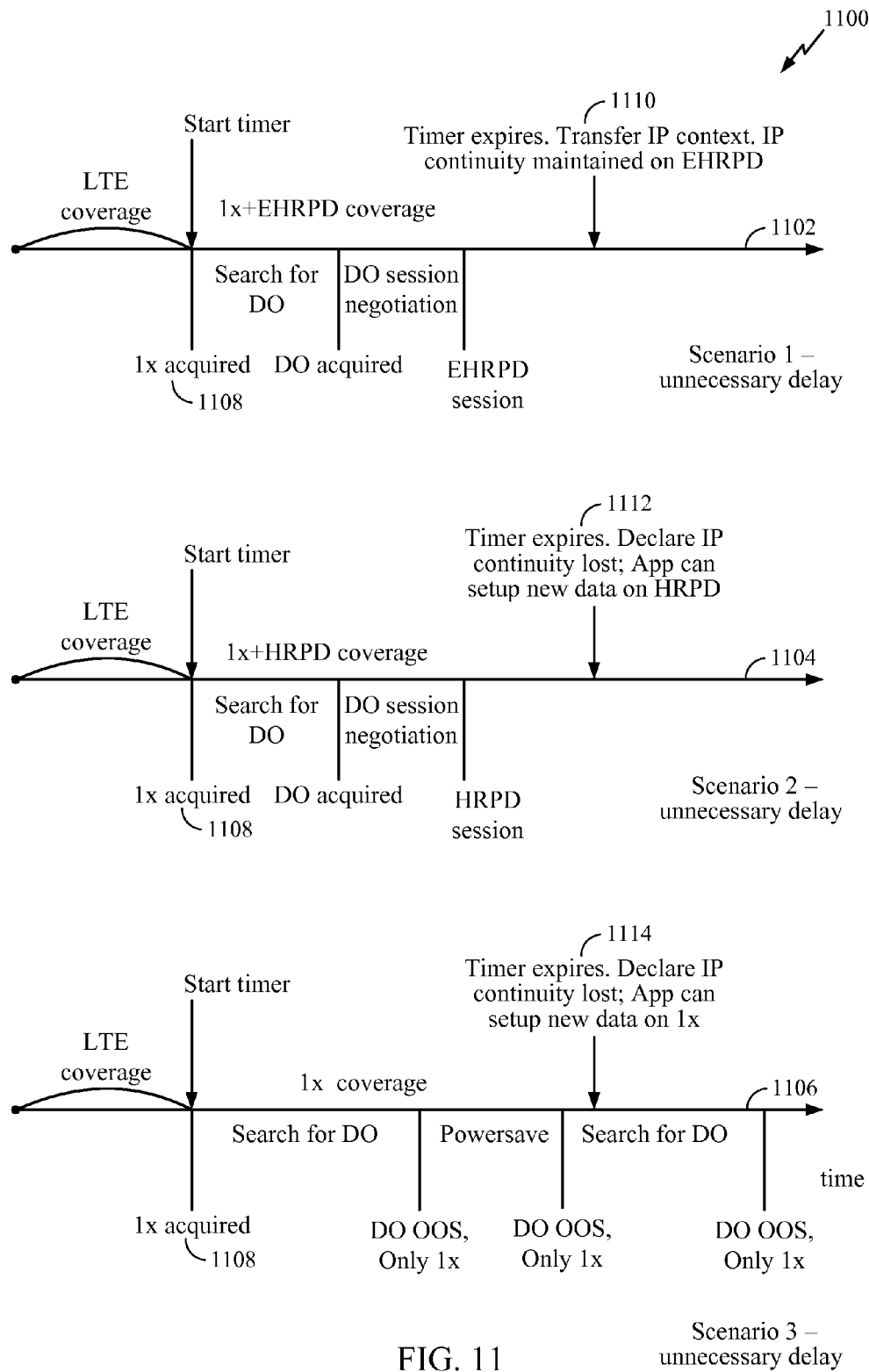
FIG. 11 illustrates an example approach for IP mobility management using a hysteresis timer, in accordance with aspects of the present disclosure.

FIG. 11 illustrates an example approach to IP mobility management 1100, according to aspects of the present disclosure. The IP mobility management module 602 may start a hysteresis timer, at 1108, when it receives notification from the system determination module 604 that a 1× network has been acquired. The IP mobility management module may not act until the hysteresis timer expires.

When a device is moving in the direction of LTE to eHRPD, if the hysteresis timer expires and EVDO is acquired and determined to be an eHRPD network, a 3GPP2-eHRPD interface may be created and IP context may be transferred from the 3GPP-LTE interface. If successful, the 3GPP-LTE interface may be locally torn down. A similar approach may be used when a device moves in the opposite direction, from eHRPD to LTE.

At 1102, Scenario 1 is illustrated, where the device acquires an EVDO network and negotiates an eHRPD session before expiration of the hysteresis timer. At 1110, the hysteresis timer expires and the device may maintain IP continuity on eHRPD and transfer IP context.

At 1104, Scenario 2 is illustrated, where the device acquires an EVDO network and negotiates an HRPD session before expiration of the hysteresis timer. At 1112, the hysteresis timer expires and the device may declare that IP continuity is lost. Applications may then setup a new data connection on HRPD.

At 1106, Scenario 3 is illustrated, where the device moves from LTE to 1×. At 1114, the hysteresis timer expires and the device has not acquired an EVDO network. Thus, the device may declare that IP continuity is lost. Applications may then set up a new data connection on the 1× network.

This approach may be advantageous when a device is in Scenario 1, since IP continuity may not be broken due to premature action. Additionally, this approach may be advantageous in scenarios where a device moves rapidly between LTE and 3GPP2 areas, since the IP mobility management module may not act until expiration of the hysteresis timer. Since no action will be preformed until the hysteresis timer expires, this approach may cause delays. For example, when an eHRPD session is negotiated the device may still wait, until the timer expires, to transfer IP context.

Accordingly, aspects of the present disclosure provide methods to avoid premature loss of IP continuity, unnecessary creation of traffic channels, and loss of data during device mobility. According to aspects, an IP mobility management module may not act immediately when a system determination module notifies it that a 1× network has been acquired.

Figure 12:
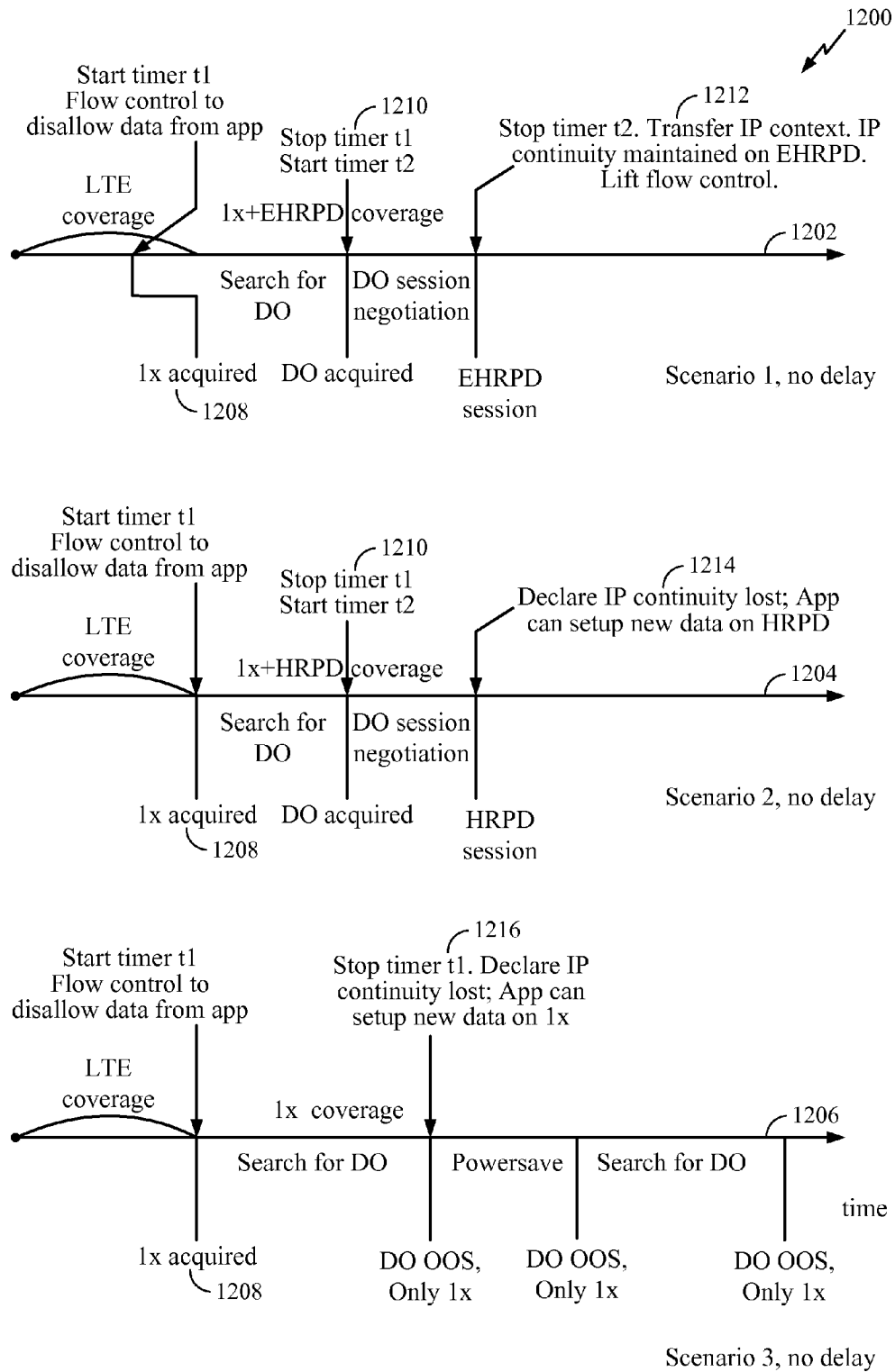
FIG. 12 illustrates an example approach for IP mobility management, in accordance with aspects of the present disclosure.

FIG. 12 illustrates an example approach for IP mobility management 1200, according to aspects of the present disclosure. At 1208, a first hysteresis timer may be initiated upon notification that 1× is acquired. The IP mobility management module may wait for another notification that the system determination module has completed a full scan of EVDO channels, when moving for LTE to eHRPD or LTE channels, when moving for eHRPD to LTE. During this time, the device may buffer data. Once buffers are full, the device may use flow control to keep the applications from sending any more data.

According to aspects, the IP mobility management module may act at the earlier of three events: when the first timer expires, when it receives notification from the system determination module that EVDO has been acquired (for LTE to eHRPD mobility) or when it receives notification that LTE has been acquired (for eHRPD to LTE mobility), or when collocated EVDO channel search is exhausted (for LTE to eHRPD device mobility) or LTE channel search is exhausted (for eHRPD to LTE device mobility).

If the first timer expires or if the IP mobility management module receives notification that the channel search is exhausted (EVDO or LTE, depending on the direction), the device may assume that IP continuity may not be maintained. The device may locally tear down the 3GPP-LTE or 3GPP2-eHRPD interface, depending on the direction of device mobility.

For LTE to eHRPD device mobility, if the IP mobility management module receives notification from the system determination module that EVDO has been acquired, the IP mobility management module may stop the first timer and initiate a second timer. At this time, the IP mobility management module may wait for either the second timer to expire or for EVDO session negotiation to complete before taking further action.

As illustrated at 1202 and 1204, according to aspects, a first timer may be initiated at 1208 when the device acquires a 1× network. When an EVDO network is acquired, at 1210, the first timer may be stopped and a second timer may be initiated. The IP mobility management module may wait for EVDO session negotiation to complete during this time.

At 1202, Scenario 1 is illustrated, showing a device moving from LTE to eHRPD. If EVDO session negotiation completes before expiration of the second timer, and if the acquired network is eHRPD, the IP mobility management module may, at 1212 stop the second timer. The IP mobility management module may create a 3GPP2-eHRPD interface, transfer context from LTE, maintain IP continuity, and lift flow control of data from the applications of the device.

A similar approach may be used when a device moves from eHRPD to LTE. For example, a first timer may be initiated when the device acquires a 1× network before acquiring an LTE network. At this time data from the applications may be buffered. If the IP mobility management module receives notification from the system determination module that LTE has been acquired, the IP mobility management module may stop the first timer and initiate a second timer. The IP mobility management module may wait for the second timer to expire or LTE attach to complete before taking further action. If LTE attach completes before expiration of the second timer, the IP mobility management module may create a 3GPP-LTE interface. The IP mobility management module may transfer context from eHRPD to LTE and maintain IP continuity. At this time, flow control of data from the applications may be lifted.

At 1204, Scenario 2 is illustrated, showing a device moving from LTE to HRPD. After EVDO session negotiation is complete, if the acquired network is HRPD, the IP mobility management module may, at 1214 stop the second timer. Since IP continuity may not be maintained, the IP mobility management module may notify the applications that IP connectivity is lost and locally tear down the 3GPP-LTE interface. The applications may set up a new data connection using the HRPD network.

At 1206, Scenario 3 is illustrated, showing a device moving from LTE to 1×. As previously described, a first timer may be initiated, at 1208, when the device acquires a 1× network. At 1216, the IP mobility management module may receive notification that the EVDO channel search is exhausted (or LTE channel search, if the device is moving from eHRPD to 1×). The IP mobility management module may, at 1216, stop the first timer, and declare loss of IP continuity. The applications may setup a new data connection on the 1× network. The device may also declare loss of IP continuity if the first timer expires prior to successfully acquiring an EVDO channel (in the case of a device moving from eHRPD to LTE) or successfully acquiring an LTE channel (in the case of a device moving from LTE to HRPD).

This approach avoids premature action and loss of IP continuity. For example, IP continuity may be maintained when a device moves from LTE to eHRPD and acquires 1× before acquiring EVDO. Similarly, when a device moves from eHRPD to LTE, IP continuity may be maintained when a device acquires 1× before LTE. Additionally, aspects avoid premature action when a device moves back and forth between LTE and 3GPP2 areas in quick succession. According to aspects, data may not be lost during device mobility and applications may experience little delay establishing IP connectivity.

Figure 13:
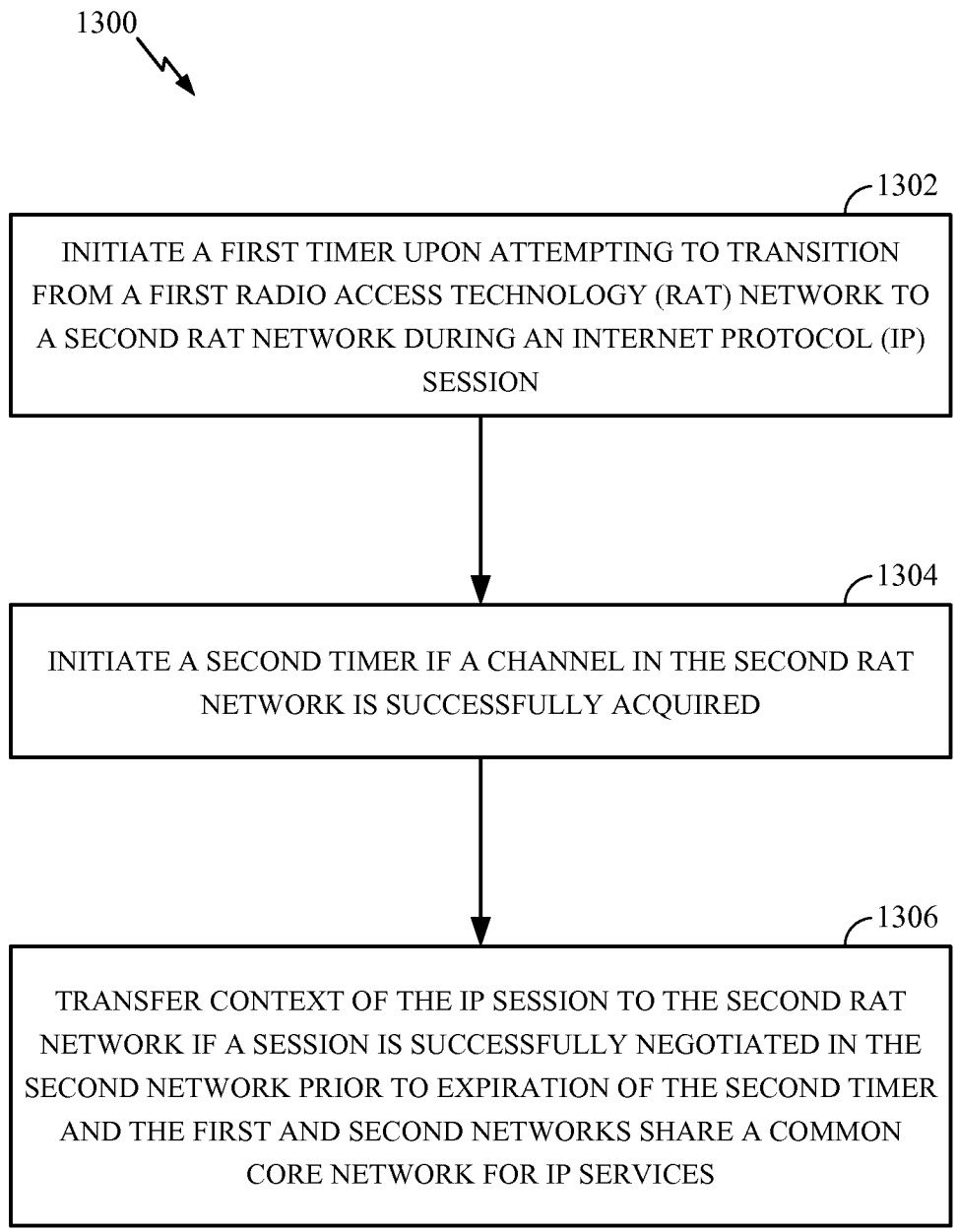
FIG. 13 illustrates example operations for maintaining IP continuity, in accordance with aspects of the present disclosure.

FIG. 13 illustrates example operations 1300 which may be performed by a module in a device, such as an IP mobility management module, according to aspects of the present disclosure.

At 1302, the module may initiate a first timer upon attempting to transition from a first RAT network to a second RAT network during an IP session. According to aspects, at least one of the first and second RAT networks may be a Long Term Evolution (LTE) network and at least one of the first and second RAT networks may be an evolved High Rate Packet Data (eHRPD) network.

According to aspects, the first RAT may comprise an LTE network and the second RAT may comprise an Evolution-Data Optimized (EVDO) network. The EVDO network may comprise at least one of an eHRPD or a High Rate Packet Data (HRPD) network.

According to aspects, the first RAT may comprise and EVDO network and the second RAT may comprise an LTE network. The EVDO network may comprise an eHRPD network.

At 1304, the module may initiate a second timer if a channel in the second RAT network is successfully acquired. At 1306, the module may transfer context of the IP session to the second RAT network if a session is successfully negotiated in the second network prior to expiration of the second timer and the first and second networks share a common core network for IP services. In some aspects, the IP mobility management module may disallow data transfer in the IP session prior to transferring the context of the IP session to the second RAT.

According to aspects, the IP mobility management module may acquire a channel in a third RAT network prior to expiration of the first timer. The third RAT network may be a 1× network. Subsequent to acquiring the channel in the third RAT, the IP mobility management module may continue to scan for channels in the second RAT network.

As previously described, the IP mobility management module may declare loss of IP continuity. For example, it may declare loss of IP continuity if the first and second networks do not share a common core network for IP services. The IP mobility management module may declare loss of IP continuity if the first timer expires prior to successfully acquiring a channel in the second network.

Aspects presented herein provide methods for a device to maintain IP continuity when transitioning from a first RAT network to a second RAT network when the first and second networks share a common core network for IP services. IP continuity may be maintained when a device moves between RATs sharing a common core network for IP services and acquires a channel in a third RAT before acquiring a channel in the desired RAT. Accordingly, aspects minimize the time for which a device may be without some type of IP connectivity and may avoid unnecessary traffic channel setups. Additionally, data may not be lost during device mobility and applications may experience little delay in establishing IP connectivity.

Various techniques are described herein with reference to an LTE network as a specific, but not limiting, example of a network in which the techniques may be used. However, those skilled in the art will appreciate that the techniques may be applied more generally in various types of wireless networks.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one" of a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
initiating a first timer upon attempting to transition from a first radio access technology (RAT) network to a second RAT network during an Internet Protocol (IP) session;
declaring a loss of IP continuity if the first timer expires prior to successfully acquiring a channel in the second network;
initiating a second timer if a channel in the second RAT network is successfully acquired; and
transferring context of the IP session to the second RAT network if a session is successfully negotiated in the second network prior to expiration of the second timer and the first and second networks share a common core network for IP services.

2. The method of claim 1, further comprising:
acquiring a channel in a third RAT network prior to expiration of the first timer; and
subsequent to acquiring the channel in the third RAT network, continuing to scan for channels in the second RAT network.

3. The method of claim 2, wherein:
the third RAT network comprises a 1× network;
the second RAT network comprises an Evolution-Data Optimized (EVDO) network; and
the first RAT network comprises a Long Term Evolution (LTE) network.

4. The method of claim 3, wherein the EVDO network comprises at least one of an evolved High Rate Packet Data (eHRPD) and High Rate Packet Data (HRPD) network.

5. The method of claim 2, wherein:
the third RAT network comprises a 1× network;
the second RAT network comprises a Long Term Evolution (LTE) network; and
the first RAT network comprises an Evolution-Data Optimized (EVDO) network.

6. The method of claim 5, wherein the EVDO network comprises an evolved High Rate Packet Data (eHRPD) network.

7. The method of claim 1, further comprising:
declaring a loss of IP continuity if the first and second networks do not share a common core network for IP services.

8. The method of claim 1, wherein at least one of the first and second RAT networks comprise a Long Term Evolution (LTE) network.

9. The method of claim 1, wherein at least one of the first and second RAT networks comprise an evolved High Rate Packet Data (eHRPD) network.

10. The method of claim 1, further comprising:
disallowing data transfer in the IP session prior to transferring the context of the IP session to the second RAT network.

11. An apparatus for wireless communications, comprising:
means for initiating a first timer upon attempting to transition from a first radio access technology (RAT) network to a second RAT network during an Internet Protocol (IP) session;
means for declaring a loss of IP continuity if the first timer expires prior to successfully acquiring a channel in the second network;
means for initiating a second timer if a channel in the second RAT network is successfully acquired; and
means for transferring context of the IP session to the second RAT network if a session is successfully negotiated in the second network prior to expiration of the second timer and the first and second networks share a common core network for IP services.

12. The apparatus of claim 11, further comprising:
means for acquiring a channel in a third RAT network prior to expiration of the first timer; and subsequent to acquiring the channel in the third RAT network, means for continuing to scan for channels in the second RAT network.

13. The apparatus of claim 12, wherein:
the third RAT network comprises a 1× network;
the second RAT network comprises an Evolution-Data Optimized (EVDO) network; and
the first RAT network comprises a Long Term Evolution (LTE) network.

14. The apparatus of claim 13, wherein the EVDO network comprises at least one of an evolved High Rate Packet Data (eHRPD) and High Rate Packet Data (HRPD) network.

15. The apparatus of claim 12, wherein:
the third RAT network comprises a 1× network;
the second RAT network comprises a Long Term Evolution (LTE) network; and
the first RAT network comprises an Evolution-Data Optimized (EVDO) network.

16. The apparatus of claim 15, wherein the EVDO network comprises an evolved High Rate Packet Data (eHRPD) network.

17. The apparatus of claim 11, further comprising:
means for declaring a loss of IP continuity if the first and second networks do not share a common core network for IP services.

18. The apparatus of claim 11, wherein at least one of the first and second RAT networks comprise a Long Term Evolution (LTE) network.

19. The apparatus of claim 11, wherein at least one of the first and second RAT networks comprise an evolved High Rate Packet Data (eHRPD) network.

20. The apparatus of claim 11, further comprising:
means for disallowing data transfer in the IP session prior to transferring the context of the IP session to the second RAT network.

21. An apparatus for wireless communications, comprising:
at least one processor configured to:
initiate a first timer upon attempting to transition from a first radio access technology (RAT) network to a second RAT network during an Internet Protocol (IP) session;
declare a loss of IP continuity if the first timer expires prior to successfully acquiring a channel in the second network;
initiate a second timer if a channel in the second RAT network is successfully acquired; and
transfer context of the IP session to the second RAT network if a session is successfully negotiated in the second network prior to expiration of the second timer and the first and second networks share a common core network for IP services; and
a memory coupled to the at least one processor.

22. The apparatus of claim 21, wherein the at least one processor is further configured to:
acquire a channel in a third RAT network prior to expiration of the first timer; and
subsequent to acquiring the channel in the third RAT network, continue to scan for channels in the second RAT network.

23. The apparatus of claim 22, wherein:
the third RAT network comprises a 1× network;
the second RAT network comprises an Evolution-Data Optimized (EVDO) network; and
the first RAT network comprises a Long Term Evolution (LTE) network.

24. The apparatus of claim 23, wherein the EVDO network comprises at least one of an evolved High Rate Packet Data (eHRPD) and High Rate Packet Data (HRPD) network.

25. The apparatus of claim 22, wherein:
the third RAT network comprises a 1× network;
the second RAT network comprises a Long Term Evolution (LTE) network; and
the first RAT network comprises an Evolution-Data Optimized (EVDO) network.

26. The apparatus of claim 25, wherein the EVDO network comprises an evolved High Rate Packet Data (eHRPD) network.

27. The apparatus of claim 21, wherein the at least one processor is further configured to:
declare a loss of IP continuity if the first and second networks do not share a common core network for IP services.

28. The apparatus of claim 21, wherein at least one of the first and second RAT networks comprise a Long Term Evolution (LTE) network.

29. The apparatus of claim 21, wherein at least one of the first and second RAT networks comprise an evolved High Rate Packet Data (eHRPD) network.

30. The apparatus of claim 21, wherein the at least one processor is further configured to:
disallow data transfer in the IP session prior to transferring the context of the IP session to the second RAT network.

31. A computer-program product for wireless communication, the computer-program product comprising a non-transitory computer-readable medium having code stored thereon, the code executable by one or more processors for:
initiating a first timer upon attempting to transition from a first radio access technology (RAT) network to a second RAT network during an Internet Protocol (IP) session;
declaring a loss of IP continuity if the first timer expires prior to successfully acquiring a channel in the second network;
initiating a second timer if a channel in the second RAT network is successfully acquired; and
transferring context of the IP session to the second RAT network if a session is successfully negotiated in the second network prior to expiration of the second timer and the first and second networks share a common core network for IP services.

32. The computer-program product of claim 31, further comprising:
code for acquiring a channel in a third RAT network prior to expiration of the first timer; and
subsequent to acquiring the channel in the third RAT network, code for continuing to scan for channels in the second RAT network.

33. The computer-program product of claim 32, wherein:
the third RAT network comprise a 1× network;
the second RAT network comprises an Evolution-Data Optimized (EVDO) network; and
the first RAT network comprises a Long Term Evolution (LTE) network.

34. The computer-program product of claim 33, wherein the EVDO network comprises at least one of an evolved High Rate Packet Data (eHRPD) and High Rate Packet Data (HRPD) network.

35. The computer-program product of claim 32, wherein:
the third RAT network comprises a 1× network;
the second RAT network comprises a Long Term Evolution (LTE) network; and
the first RAT network comprises an Evolution-Data Optimized (EVDO) network.

36. The computer-program product of claim 35, wherein the EVDO network comprises an evolved High Rate Packet Data (eHRPD) network.

37. The computer-program product of claim 31, further comprising:
 code for declaring a loss of IP continuity if the first and second networks do not share a common core network for IP services.

38. The computer-program product of claim 31, wherein at least one of the first and second RAT networks comprise a Long Term Evolution (LTE) network.

39. The computer-program product of claim 31, wherein at least one of the first and second RAT networks comprise an evolved High Rate Packet Data (eHRPD) network.

40. The computer-program product of claim 31, further comprising:
 code for disallowing data transfer in the IP session prior to transferring the context of the IP session to the second RAT network.

* * * * *